(12) United States Patent
Terada et al.

(10) Patent No.: US 7,661,823 B2
(45) Date of Patent: Feb. 16, 2010

(54) PRISM STRUCTURE AND PROJECTOR

(75) Inventors: Yoshihiro Terada, Azumino (JP); Takashi Saegusa, Matsumoto (JP); Hidetoshi Hashizume, Azumino (JP); Eiji Yokoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 517 days.

(21) Appl. No.: 11/336,777

(22) Filed: Jan. 23, 2006

(65) Prior Publication Data

US 2006/0209265 A1 Sep. 21, 2006

(30) Foreign Application Priority Data

Mar. 17, 2005 (JP) .............................. 2005-076857

(51) Int. Cl.
    *G03B 21/14* (2006.01)
(52) U.S. Cl. ........................ 353/33; 353/122; 353/81; 349/58
(58) Field of Classification Search ............ 353/33, 353/22, 20, 84, 81; 349/18, 9, 57, 58, 96–99; 348/751–757
    See application file for complete search history.

(56) References Cited

U.S. PATENT DOCUMENTS

| 6,135,600 | A  | * | 10/2000 | Fujimori ..................... 353/119 |
| 6,254,238 | B1 | * | 7/2001  | Takamatsu .................. 353/61 |
| 6,322,217 | B1 | * | 11/2001 | Fujimori et al. ............... 353/31 |
| 6,565,213 | B1 | * | 5/2003  | Yamaguchi et al. .......... 353/33 |
| 6,587,167 | B1 | * | 7/2003  | Fujimori et al. ............... 349/58 |
| 6,657,680 | B2 | * | 12/2003 | Takizawa ....................... 349/5 |
| 6,733,141 | B2 | * | 5/2004  | Lee ............................. 353/122 |
| 6,854,848 | B2 | * | 2/2005  | Fujimori et al. ............... 353/20 |
| 6,866,389 | B2 | * | 3/2005  | Ito et al. ...................... 353/119 |
| 6,961,165 | B2 | * | 11/2005 | Uehara ....................... 359/237 |
| 6,966,653 | B2 | * | 11/2005 | Kitabayashi ................. 353/60 |
| 6,981,772 | B2 | * | 1/2006  | Kim ............................. 353/81 |
| 6,984,042 | B2 | * | 1/2006  | Halsberghe et al. .......... 353/33 |
| 7,055,970 | B2 | * | 6/2006  | Kitabayashi ................ 353/100 |
| 7,114,811 | B2 | * | 10/2006 | Arai et al. ..................... 353/20 |
| 7,118,222 | B2 | * | 10/2006 | Kitabayashi ................. 353/52 |
| 7,118,230 | B2 | * | 10/2006 | Fujimori et al. ............. 353/119 |
| 7,140,732 | B2 | * | 11/2006 | Shiraishi et al. ............... 353/33 |

(Continued)

FOREIGN PATENT DOCUMENTS

| JP | 10-010994 | 1/1998 |
| JP | 10-133279 | 5/1998 |

(Continued)

*Primary Examiner*—William C Dowling
(74) *Attorney, Agent, or Firm*—Oliff & Berridge, PLC (57) ABSTRACT

A prism structure that includes: a plurality of liquid crystal devices each include a liquid crystal panel and a light emitting-side optical element, and generate an image light through modulation of any of a plurality of color lights in accordance with image information; and a cross dichroic prism that combines the image lights coming from the liquid crystal devices. In the prism structure, each of the liquid crystal devices further includes: a fixture member that is fixed to the cross dichroic prism; a retention member that keeps hold of the liquid crystal panel, and is fixed to the fixture member; and a light emitting-side optical element retention member that keeps hold of the light emitting-side optical element, and is rotation-adjustable about an illumination axis. The light emitting-side optical element retention member is rotation-adjusted about the illumination axis before fixation to the retention member.

14 Claims, 10 Drawing Sheets

U.S. PATENT DOCUMENTS

| | | | |
|---|---|---|---|
| 7,148,945 | B2 | 12/2006 | Yanagisawa |
| 7,345,724 | B2 * | 3/2008 | Yoshimura et al. .......... 349/117 |
| 2005/0105054 | A1 * | 5/2005 | Arai et al. .................... 353/20 |
| 2005/0134802 | A1 * | 6/2005 | Furuta et al. ................. 353/20 |

FOREIGN PATENT DOCUMENTS

| | | |
|---|---|---|
| JP | 11-133504 | 5/1999 |
| JP | 11-142993 | 5/1999 |
| JP | 11-202409 | 7/1999 |
| JP | 11-218746 | 8/1999 |
| JP | 11-242186 | 9/1999 |
| JP | 2000-111864 | 4/2000 |
| JP | 2000-221461 | 8/2000 |
| JP | 2000-259093 | 9/2000 |
| JP | 2001-033873 | 2/2001 |
| JP | 2001-159782 | 6/2001 |
| JP | 2001-222061 | 8/2001 |
| JP | 2004-037864 | 2/2004 |
| JP | 2004-205593 | 7/2004 |
| JP | 2004-361586 | 12/2004 |
| JP | 2005-017502 | 1/2005 |
| JP | A-2005-043679 | 2/2005 |
| JP | 2005-107364 | 4/2005 |
| JP | 2005-173264 | 6/2005 |
| JP | 2005-234124 | 9/2005 |
| WO | WO 2004-81657 A | 9/2004 |

* cited by examiner

RELATED ART

FIG. 9

RELATED ART

F I G. 10

RELATED ART

PRISM STRUCTURE AND PROJECTOR

BACKGROUND

1. Technical Field

The present invention relates to a prism structure and a projector.

2. Related Art

Figure 8:
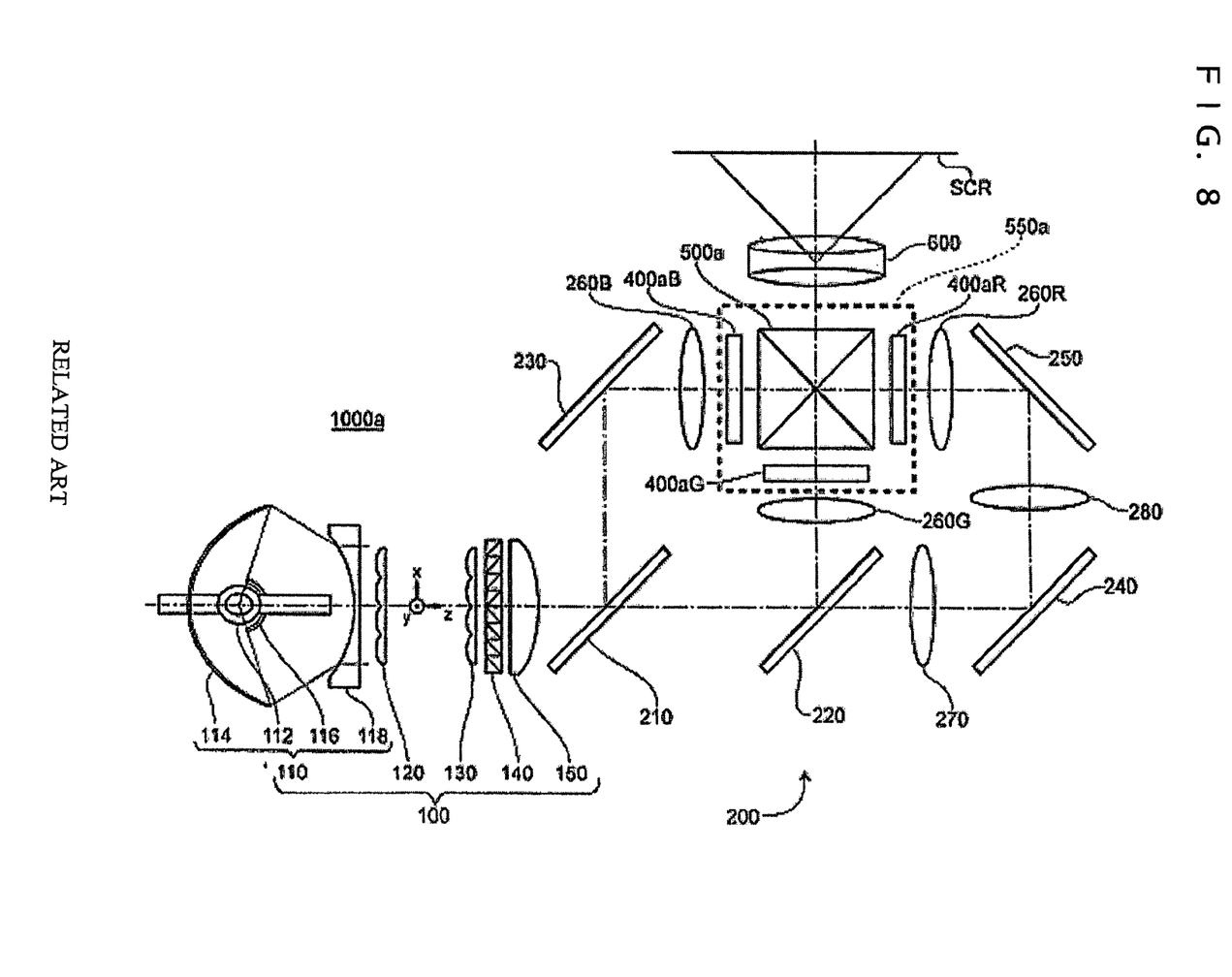
FIG. 8 is a diagram showing a general system of a projector.

FIG. 8 is a diagram showing a system of a general type provided to a projector. In the accompanying drawings and descriptions below, a z axis is along the traveling direction of lights, an x axis is vertical to the z axis and parallel to the paper surface of FIG. 8, and a y axis is vertical to both the z axis the paper surface of FIG. 8.

As shown in FIG. 8, a projector 1000a is configured to include an illumination device 100, a color separation light guiding system 200, three liquid crystal devices 400aR, 400aG, and 400aB, a cross dichroic prism 500a, and a projection system 600. Specifically, the color separation light guiding system 200 separates a light coming from the illumination device 100 into three color lights of red, green, and blue. The liquid crystal devices 400aR, 400aG, and 400aB each generate an image light through modulation of, in accordance with image information, the three color lights as results of separation by the color separation light guiding system 200. The cross dichroic prism 500a combines the image lights generated by those three liquid crystal devices 400aR, 400aG, and 400aB. The projection system 600 projects the image light as a result of combination in the cross dichroic prism 500a onto a projection surface such as screen SCR.

In recent years, such a projector is often provided with a prism structure, which is a combination unit that includes the entire or part of components of liquid crystal devices, and a cross dichroic prism. The components of liquid crystal devices are exemplified by a liquid crystal panel, a light emitting-side polarizer, and others. For an exemplary projector of such a type, refer to Patent Document 1 (JP-A-10-10994 (FIG. 7)).

Figure 9:
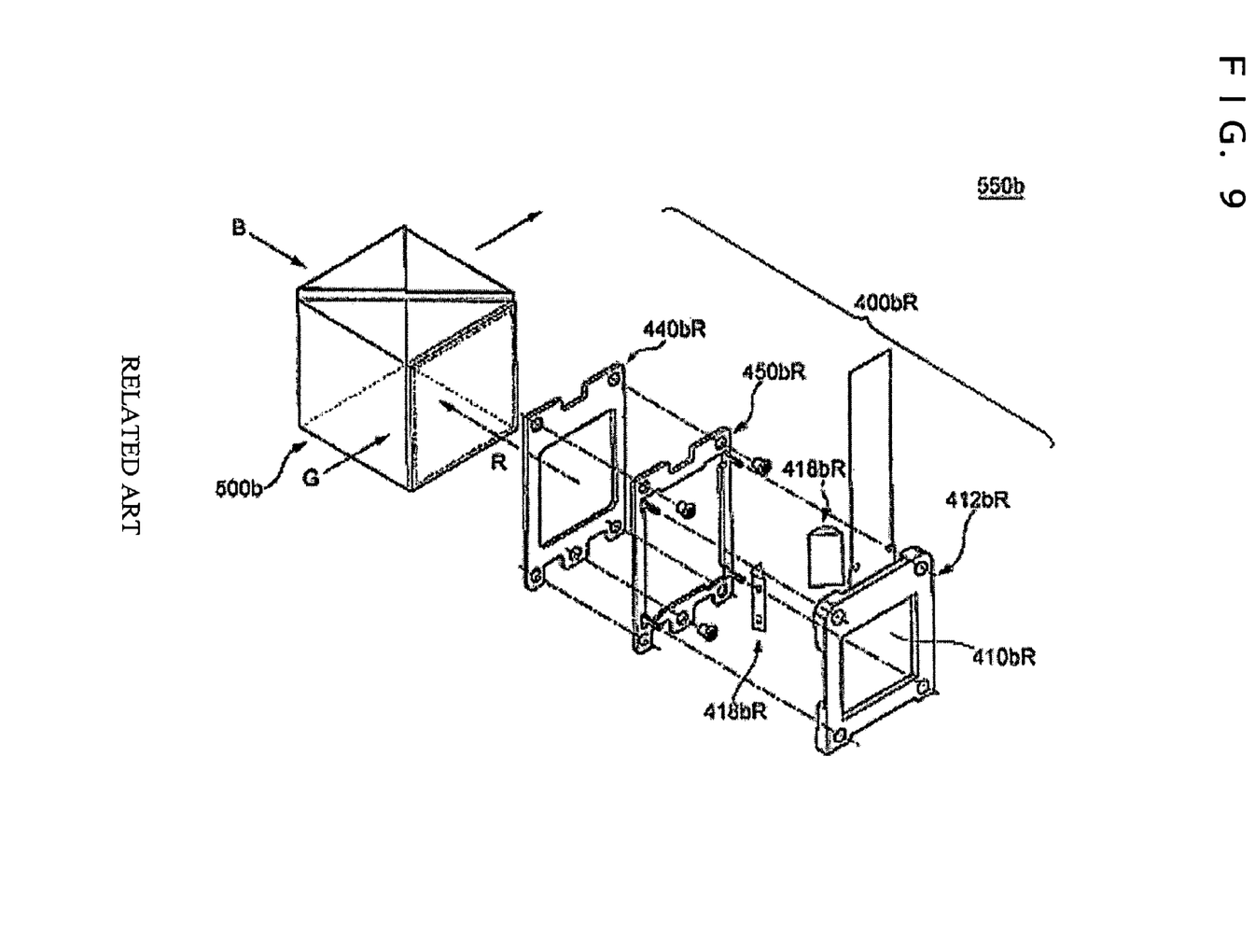
FIG. 9 is a diagram for illustrating a prism structure 550b.

FIG. 9 is a diagram for illustrating such a prism structure 550b.

As shown in FIG. 9, in the prism structure 550b, a liquid crystal panel 410bR specifically for red lights is retained by a liquid crystal panel retention frame 412bR in its concave portion. A cross dichroic prism 500b is affixed with a fixture frame 440bR on its light incident-side surface. The fixture frame 440bR is screwed with an intermediate frame 450bR.

The liquid crystal panel 410bR is put into the temporarily-screwed state through insertion and engagement of pins into each corresponding hole of the liquid crystal panel retention frame 412bR. The pins are each protruding from the corner of the intermediate frame 450bR. While being in the temporarily-screwed state, the liquid crystal panel 410bR is positioned by a pair of wedges 418bR and 418bR being pushed between the liquid crystal panel 410bR and the liquid crystal panel retention frame 412bR. These wedges 418bR and 418bR are eventually adhered for fixation to the fixture frame 440bR. Although not shown, other liquid crystal panels 410bG and 410bB are similarly subjected to such positioning and fixation so that the liquid crystal panels 410bR, 410bG, and 410bB are all positioned with precision.

The problem here is that, however, such a prism structure 550b requires a number of components including the fixture frame 440bR, the intermediate frame 450bR, the liquid crystal panel retention frame 412bR, the wedges 418bR and 418bR, and others. Assembling such many components also requires a lot of work and makes the processes complicated, and thus reducing the manufacturing cost is not that easy.

In consideration of the above, the inventor of the present invention has filed an application for the prism structure that can solve the above problems (JP-A-2005-234124).

Figure 10:
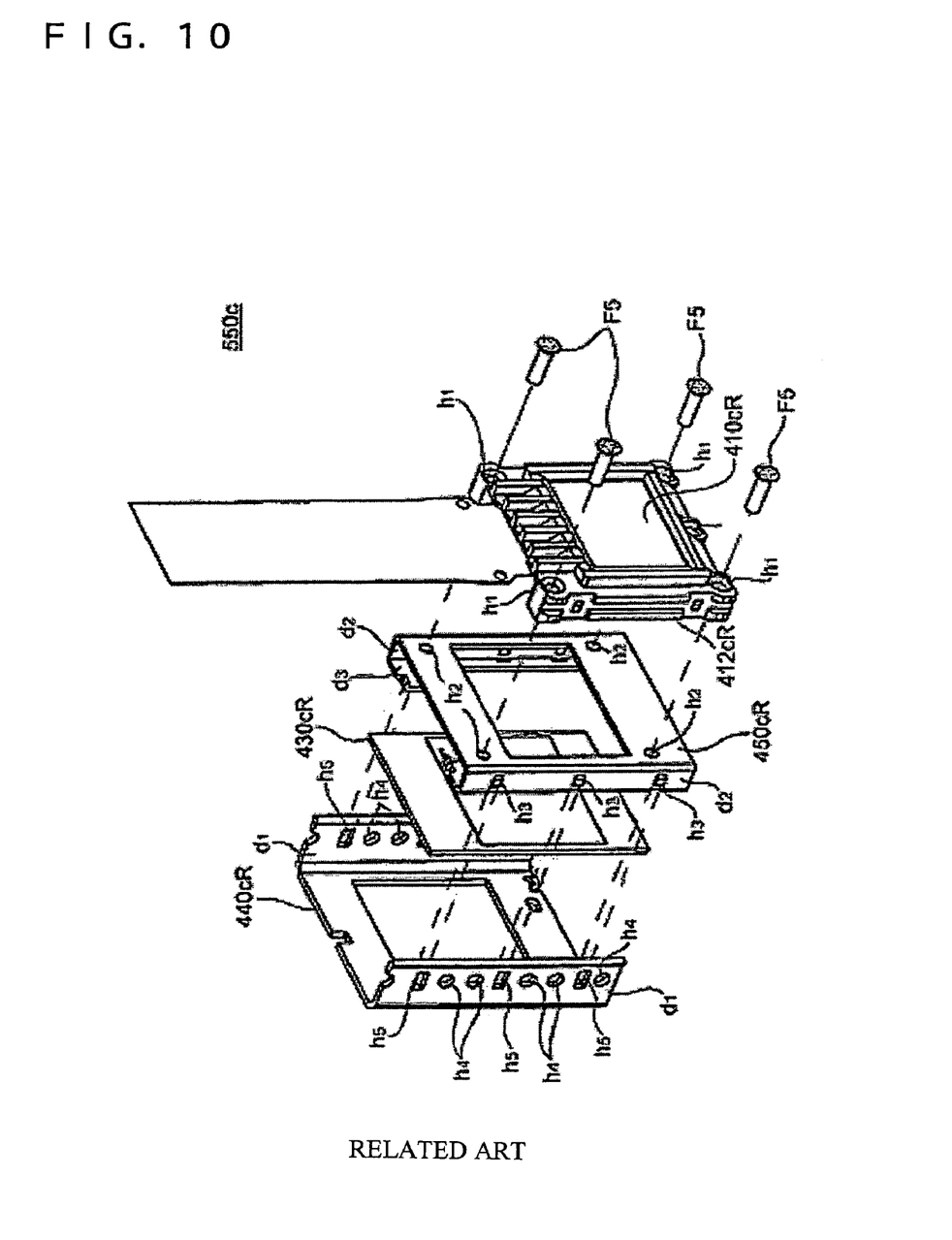
FIG. 10 is a diagram for illustrating a prism structure 550c.

FIG. 10 is a diagram for illustrating a prism structure 550c in the above related art. The prism structure 550c (partially not shown) is a combination unit with a part of components of liquid crystal devices 400cR, 400cG, and 400cB (partially not shown), and a cross dichroic prism 500c (not shown). The components here include a liquid crystal panel 410cR, and a light emitting-side polarizer 430cR. This prism structure 550c is configured to include a fixture member 440cR and a retention member 450cR. The fixture member 440cR is provided with a stand-up piece $d_1$ each at both ends, and has the C-shaped cross section. The retention member 450cR is provided with a stand-up piece each at both ends, and also has the C-shaped cross section. The stand-up pieces $d_1$ and $d_1$ of the fixture member 440cR are so assembled as to slide in contact with the stand-up pieces $d_2$ and $d_2$ of the retention member 450cR.

In the prism structure 550c of such a configuration, after the fixture member 440cR is combined together with the retention member 450cR for fixation, the liquid crystal panel 410cR is attached and fixed to the cross dichroic prism 500c. This accordingly reduces the number of components required to attach the liquid crystal panel 410cR to the cross dichroic prism 500c, i.e., only the fixture member 440cR, and the retention member 450cR. As a result, the assembly procedure is simplified so that the manufacturing cost can be reduced.

The issue is that, with the prism structure 550c, the process remains complicated to dispose the light emitting-side polarizer 430cR with a right angle with respect to the liquid crystal panel 410cR and the cross dichroic prism 500c. This is due to the configuration that the light emitting-side polarizer 430cR is glued with adhesive to a light emitting-side surface $d_3$ of the retention section 450cR.

The recently-popular liquid crystal device in a projector includes a viewing angle compensation plate or a second light emitting-side polarizer between a liquid crystal panel and a light emitting-side polarizer. This is aimed to increase the viewing angle characteristics, the contrast characteristics, and others. Similarly to the above-described case with the light emitting-side polarizer, such viewing angle compensation plate and second light emitting-side polarizer both fail in implementing a predetermined viewing angle or contrast if they are not correctly angled with respect to the liquid crystal panel and the cross dichroic prism.

The related art of JP-A-2005-234124 presents no description, not in the specification or in the accompanying drawings, about how to correctly angle the viewing angle compensation plate or the second light emitting-side polarizer with respect to the liquid crystal panel 410cR, the cross dichroic prism 500c, and others.

SUMMARY

An advantage of some aspects of the invention is to provide a prism structure of a configuration capable of easing the process of correctly angling the light emitting-side optical elements such as a light emitting-side polarizer, a viewing angle compensation plate, or a second light emitting-side polarizer, with respect to a liquid crystal panel and a cross dichroic prism. Another advantage of some aspects of the invention is to provide a projector including such a prism structure, and being with a wider viewing angle or a higher contrast.

A first aspect of the invention is directed to a prism structure that includes: a plurality of liquid crystal devices each include a liquid crystal panel and a light emitting-side optical element, and generate an image light through modulation of any of a plurality of color lights in accordance with image information; and a cross dichroic prism that combines the image lights coming from the liquid crystal devices. In the prism structure, each of the liquid crystal devices further includes: a fixture member that is fixed to the cross dichroic prism; a retention member that keeps hold of the liquid crystal panel, and is fixed to the fixture member; and a light emitting-side optical element retention member that keeps hold of the light emitting-side optical element, and is rotation-adjustable about an illumination axis. The light emitting-side optical element retention member is rotation-adjusted about the illumination axis before fixation to the retention member.

As such, according to the prism structure of the first aspect of the invention, the light emitting-side optical element retention member keeping hold of the light emitting-side optical element is subjected to rotation adjustment about the illumination axis before fixation to the retention member. Accordingly, the light emitting-side optical element can be correctly angled with respect to the liquid crystal panel and the cross dichroic prism.

According to the prism structure of the first aspect of the invention, angling the light emitting-side optical element can be implemented with such a considerably simple process that the light emitting-side optical element retention member is subjected to rotation adjustment about the illumination axis before fixation to the retention member.

As such, the prism structure of the first aspect of the invention can be of a configuration capable of easing the process of correctly angling a light emitting-side optical element with respect to a liquid crystal panel and a cross dichroic prism.

In the prism structure of the first aspect of the invention, preferably, the retention member is provided with a circular guiding hole for rotation adjustment of the light emitting-side optical element, and the light emitting-side optical element retention member is provided with a pin that can be inserted into the guiding hole.

Such a configuration enables to subject the light emitting-side optical element retention member to rotation adjustment about the illumination axis by moving the pin provided to the light emitting-side optical element retention member along the guiding hole of the retention member. This favorably leads to the smooth implementation of fixing the light emitting-side optical element retention member to the retention member after rotation adjustment about the illumination axis.

In the prism structure of the first aspect of the invention, preferably, the light emitting-side optical element retention member is subjected to rotation adjustment while being pushed against the retention member before attachment fixation to the retention member.

Such a configuration favorably controls the tilt of the light emitting-side polarizer with respect to the illumination axis so that the chromatic aberration due to the tilt is prevented from occurring.

In the prism structure of the first aspect of the invention, preferably, the light emitting-side optical element retention member is provided with a hold section for holding the retention member, and the light emitting-side optical element retention member is subjected to rotation adjustment while being pushed against the retention member by elasticity of the hold section before attachment fixation to the retention member.

The light emitting-side optical element retention member may be pushed against the hold section using a specific hold jig configured by a spring member. Alternatively, the above-described configuration is capable of easing, to a further degree, the process of fixing the light emitting-side optical element retention member to the retention member after rotation adjustment about the illumination axis.

In the prism structure of the first aspect of the invention, preferably, the liquid crystal devices are each further provided with a light emitting-side polarizer that is attached to the cross dichroic prism, and the light emitting-side optical element retention member is a viewing angle compensation plate.

With such a configuration, by using the prism structure of the invention to a projector, the resulting projector can have a wider viewing angle.

In the prism structure of the first aspect of the invention, preferably, the liquid crystal devices are each further provided with a light emitting-side polarizer that is attached to the cross dichroic prism, and the light emitting-side optical element is a second light emitting-side polarizer.

With such a configuration, by using the prism structure of the invention to a projector, the resulting projector can have a higher contrast.

In the prism structure of the first aspect of the invention, preferably, the retention member keeps hold of the light emitting-side optical element with a space both from the liquid crystal panel and the light emitting-side polarizer.

By spacing the light emitting-side optical element from a light emitting-side polarizer and a liquid crystal panel both being a heat-producing member, the resulting configuration is not susceptible to heat that much, and becomes ready for projectors of high brightness.

In the prism structure of the first aspect of the invention, preferably, the light emitting-side optical element is a light emitting-side polarizer.

With such a configuration, by using the prism structure of the invention to a projector, the resulting projector can have a higher contrast.

A second aspect of the invention is directed to a projector that includes: an illumination device; a color separation light guiding system that separates an illumination light coming from the illumination device into a plurality of color lights; a prism structure that emits an image light as a result of modulation and combination of the color lights coming from the color separation light guiding system in accordance with image information; and a projection system that projects the image light emitted from the prism structure. In the projector, the prism structure is the prism structure of the invention.

According to the projector of the invention, by including the prism structure of the invention as above, the projector can have a wider viewing angle or a higher contrast.

BRIEF DESCRIPTION OF THE DRAWINGS

A prism structure and a projector of the invention will be described below based on illustrated embodiments.

DESCRIPTION OF EXEMPLARY EMBODIMENTS

First Embodiment

Figure 1:
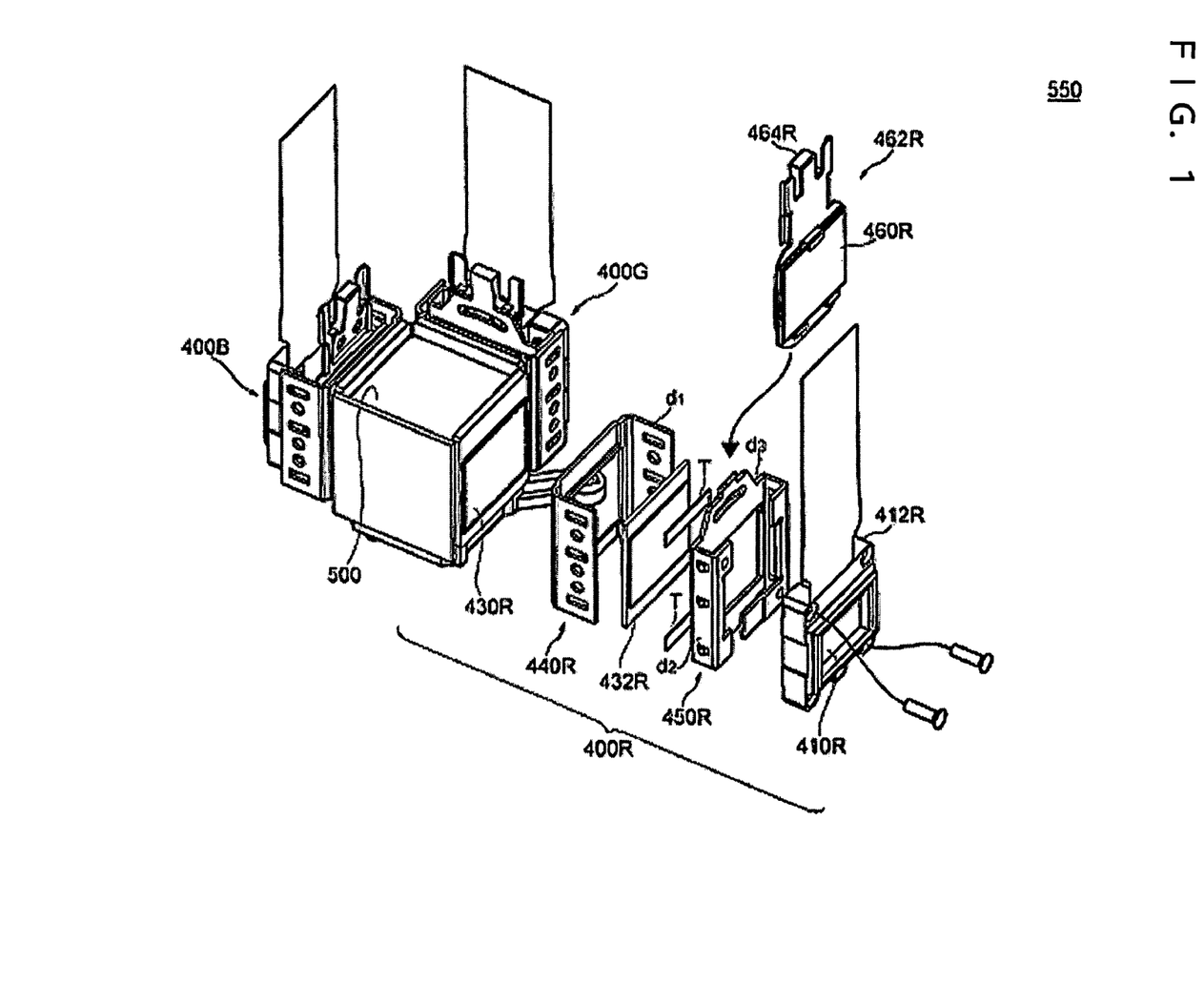
FIG. 1 is perspective view for illustrating a prism structure 550 of a first embodiment.
Figure 2:
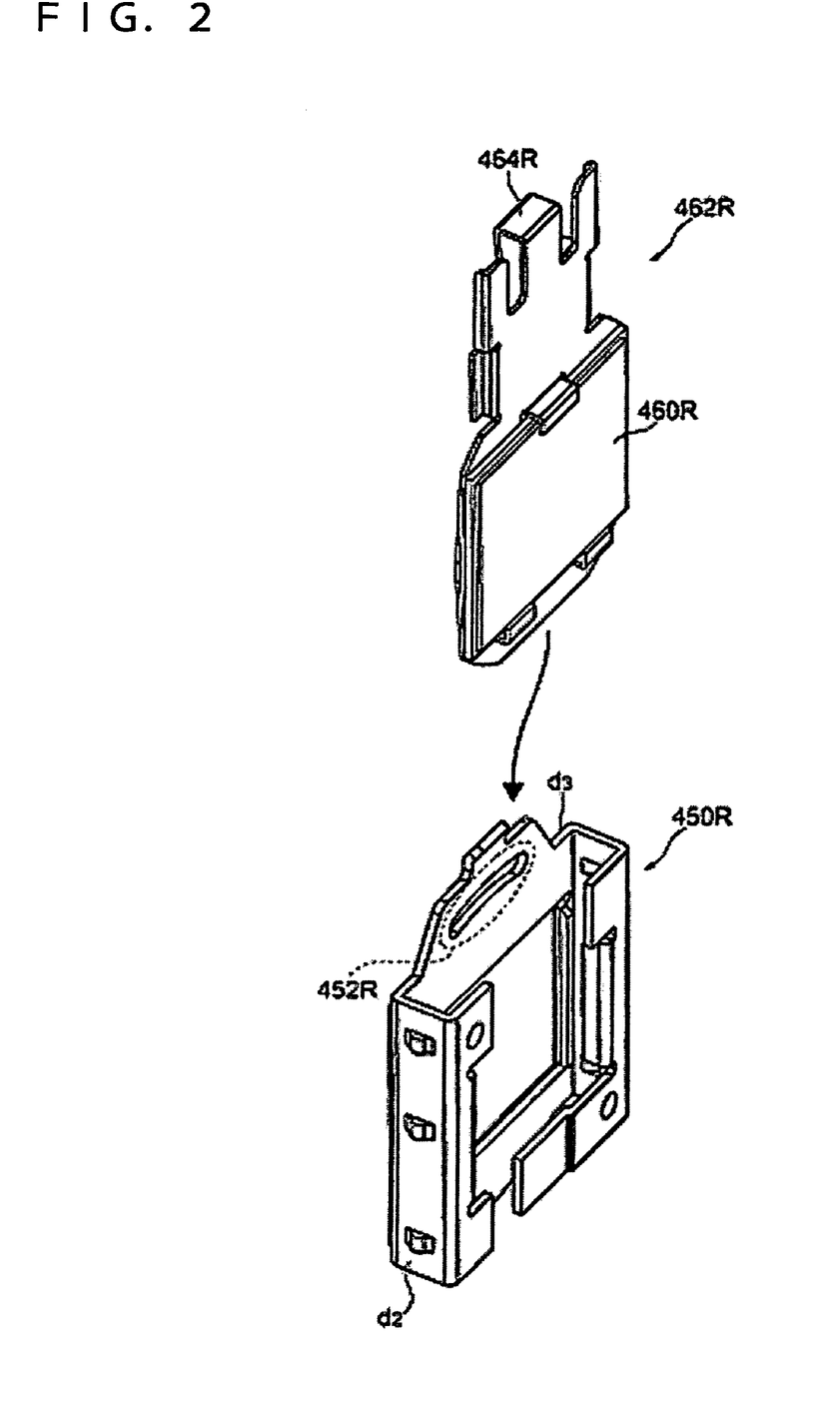
FIG. 2 is a diagram for illustrating both a retention member 450R and a light emitting-side optical element retention member 462R for use in the first embodiment.

FIG. 1 is a perspective view for illustrating a prism structure 550 of a first embodiment. FIG. 2 is a diagram for illustrating both a retention member 450R and a light emitting-side optical element retention member 462R for use in the first embodiment.

Note here that, in FIG. 1, a light emitting-side optical element retention member in a liquid crystal device 400G is not fully shown at its hold section.

As shown in FIG. 1, the prism structure 550 of the first embodiment is configured to include liquid crystal devices 400R, 400G, and 400B for red lights, green lights, and blue lights, respectively, and a cross dichroic prism 500. The liquid crystal device 400R is provided with a liquid crystal panel 410R, and a viewing angle compensation plate 460R serving as a light emitting-side optical element. The liquid crystal device 400R generates image lights through modulation of red lights in accordance with image information. The liquid crystal devices 400G and 400B serve similarly to the liquid crystal device 400R. The cross dichroic prism 500 combines the image lights generated by the liquid crystal devices 400R, 400G, and 400B.

The liquid crystal devices 400R, 400G, and 400B are sharing basically the same configuration. Therefore, the configuration of the liquid crystal device 400R for red lights is described in detail below.

As shown in FIG. 1, the liquid crystal device 400R is provided with a fixture member 440R, a retention member 450R, and a light emitting-side optical element retention member 462R. Specifically, the fixture member 440R is fixed to the cross dichroic prism 500. The retention member 450R keeps hold of the liquid crystal panel 410R, and is fixed to the fixture member 440R. The light emitting-side optical element retention member 462R keeps hold of the viewing angle compensation plate 460R, and serves as a light emitting-side optical element retention member that is rotation-adjustable about an illumination axis. The liquid crystal device 400R is also provided with a light emitting-side polarizer 430R, and a second light emitting-side polarizer 432R. The light emitting-side polarizer 430R is affixed to the cross dichroic prism 500 on its light incident-side surface. The second light emitting-side polarizer 432R is affixed to the retention member 450R on its light emitting-side surface $d_3$ using a double-faced tape T. The liquid crystal panel 410R is retained by a liquid crystal panel retention frame 412R in its concave portion.

In the prism structure 550 of the first embodiment configured as such, the light emitting-side optical element retention member 462R is subjected to rotation adjustment about an illumination axis before fixation to the retention member 450R. As shown in FIG. 2, the retention member 450R is provided with a circular guiding hole 452R for rotation adjustment of the viewing angle compensation plate 460R, which is combined to the light emitting-side optical element retention member 462R to be a piece therewith. The light emitting-side optical element retention member 462R is provided with a pin 466R that can be inserted into the guiding hole 452R formed to the retention member 450R (refer to FIGS. 3A to 4C).

Figure 3A:
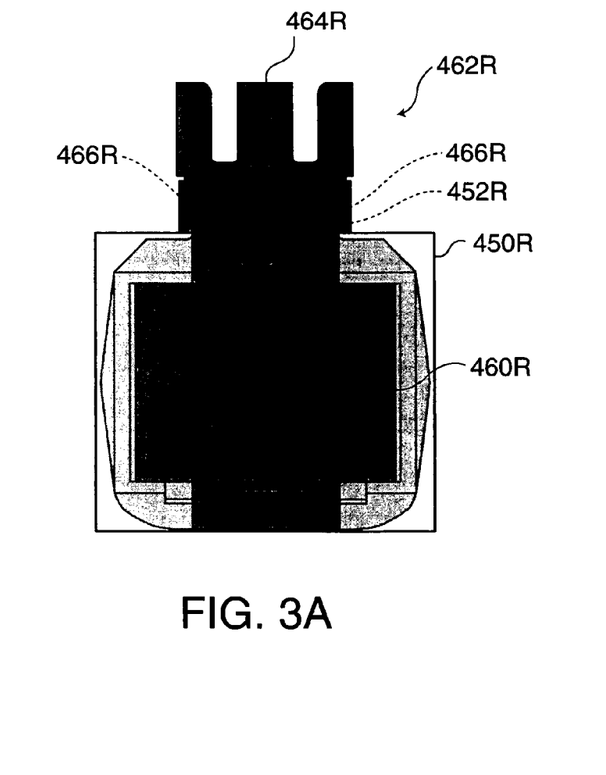
FIGS. 3A and 3B are both a diagram for illustrating the effects and advantages of the prism structure 550 of the first embodiment.
Figure 3B:
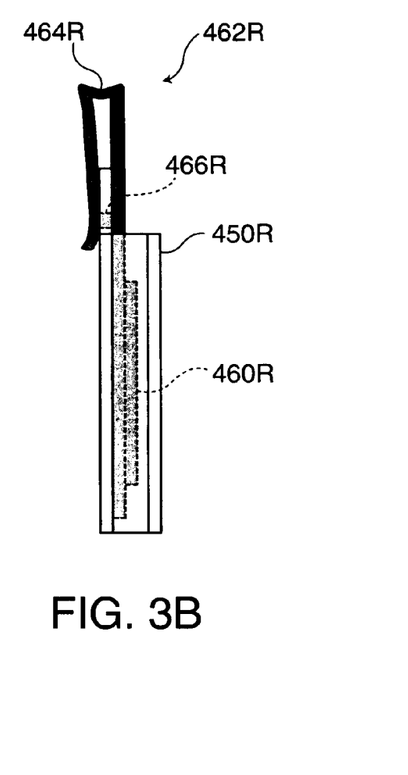
Figure 4A:
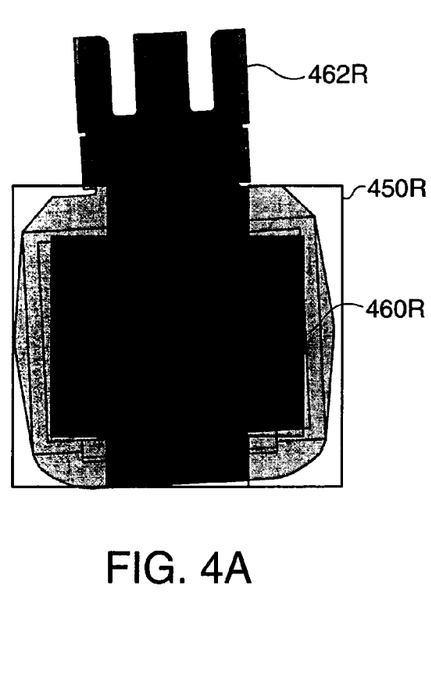
FIGS. 4A to 4C are all a diagram for illustrating the effects and advantages of the prism structure 550 of the first embodiment.
Figure 4B:
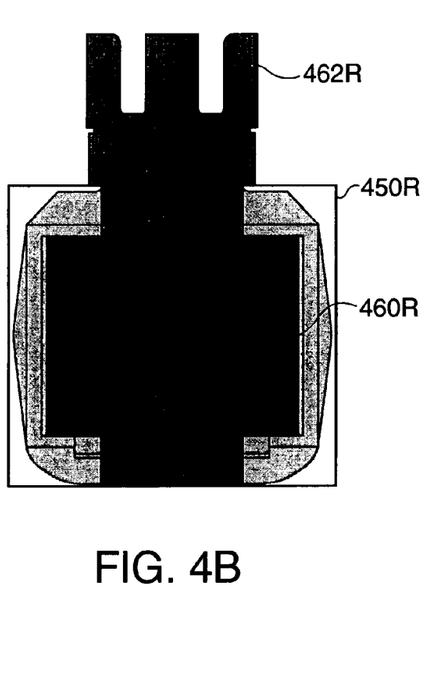
Figure 4C:
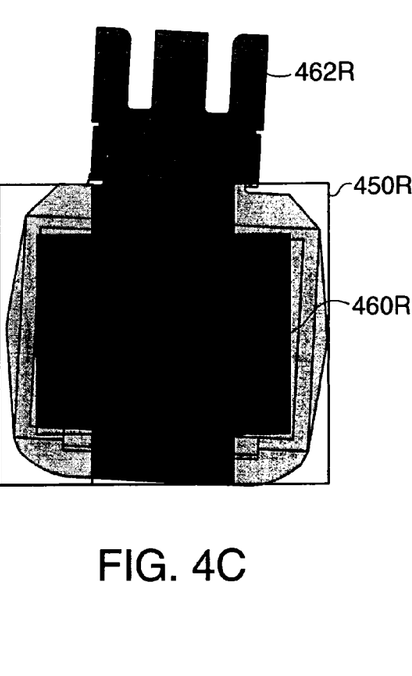
Figure 5:
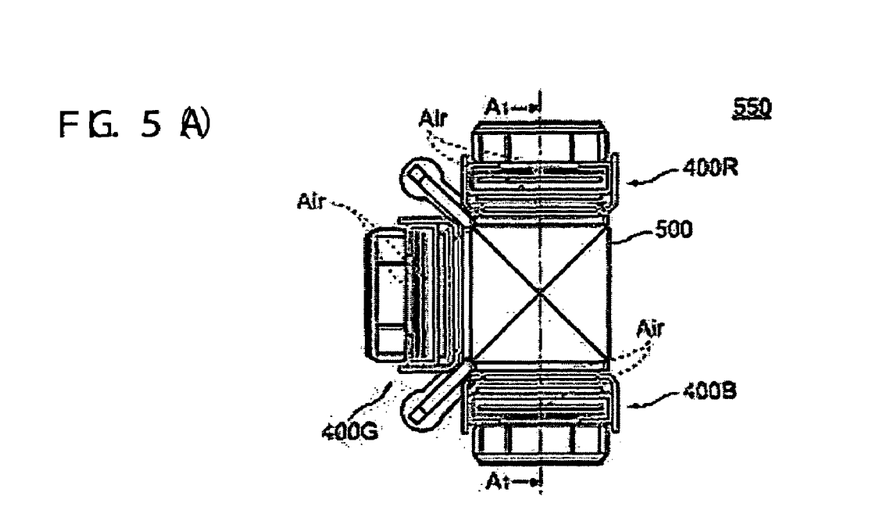
FIGS. 5A to 5C are all a diagram for illustrating the effects and advantages of the prism structure 550 of the first embodiment.

FIGS. 3A to 5C are all a diagram for illustrating the effects and advantages of the prism structure 550 of the first embodiment. FIG. 3A is a front view showing the state that the light emitting-side optical element retention member 462R is inserted into the retention member 450R. FIG. 3B is a side view showing the state that the light emitting-side optical element retention member 462R is inserted into the retention member 450R. FIG. 4A is a front view showing the state of rotation adjustment made in the left direction after insertion of the light emitting-side optical element retention member 462R into the retention member 450R. FIG. 4B is a front view showing the state before rotation adjustment but after insertion of the light emitting-side optical element retention member 462R into the retention member 450R. FIG. 4C is a front view showing the state of rotation adjustment made in the right direction after insertion of the light emitting-side optical element retention member 462R into the retention member 450R. FIG. 5A is a top view showing the state that the prism structure 550 is cooled. FIG. 5B is a cross sectional view cut along a line $A_1$-$A_1$ of FIG. 5A, and FIG. 5C is a partially enlarged view of a main component of FIG. 5A.

In the prism structure 550 of the first embodiment, as shown in FIGS. 4A to 4C, the light emitting-side optical element retention member 462R that keeps hold of the viewing angle compensation plate 460R is subjected to rotation adjustment about an illumination axis before fixation to the retention member 450R. This accordingly angles correctly the viewing angle compensation plate 460R with respect to the liquid crystal panel 410R and the cross dichroic prism 500.

What is more, with the prism structure 550 of the first embodiment, such an angle operation can be implemented with a considerably simple process of subjecting the light emitting-side optical element retention member 462R to rotation adjustment about an illumination axis before fixation to the retention member 450R.

As such, the prism structure 550 of the first embodiment can be of a configuration capable of easing the process of correctly angling the viewing angle compensation plate 460R with respect to the liquid crystal panel 410R and the cross dichroic prism 500.

As shown in FIG. 2, in the prism structure 550 of the first embodiment, the retention member 450R is provided with a circular guiding hole 452R for rotation adjustment of the viewing angle compensation plate 460R. As shown in FIGS. 3A and 3B the light emitting-side optical element retention member 462R is provided with a pin 466R that can be inserted into the guiding hole 452R of the retention member 450R.

As such, as shown in FIGS. 4A to 4C, according to the prism structure 550 of the first embodiment, the light emitting-side optical element retention member 462R can be subjected to rotation adjustment about an illumination axis through movement of the pin 466R thereof along the guiding hole 452R of the retention member 450R. It is possible to rotate and adjust the light emitting-side optional element retention member 462R about the illumination axis and lead to the smooth implementation of fixing the light emitting-side optical element retention member 462R to the retention member 450R after rotation adjustment about the illumination axis.

As shown in FIGS. 2 to 3B, in the prism structure 550 of the first embodiment, the light emitting-side optical element retention member 462R is provided with a hold section 464R for holding the retention member 450R. The light emitting-side optical element retention member 462R is subjected to rotation adjustment while being pushed against the retention member 450R by elasticity of the hold section 464R before attachment fixation to the retention member 450R.

With such a prism structure 550 of the first embodiment, the process can be eased to a further degree to fix the light emitting-side optical element retention member 462R to the retention member 450R after rotation adjustment about an illumination axis.

What is better, the light emitting-side optical element retention member 462R is pushed against the light emitting-side surface $d_3$ of the retention member 450R by elasticity of the hold section 464R so that the tilt of the viewing angle compensation plate 460R is controlled with respect to the illumination axis, thereby preventing the chromatic aberration due to the tilt from occurring.

In the prism structure 550 of the first embodiment, as shown in FIG. 1, the liquid crystal device 400R is further provided with a light emitting-side polarizer 430R that is affixed to the cross dichroic prism 500. As shown in FIGS. 5A to 5C, the retention member 450R keeps hold of the viewing angle compensation plate 460R with a space both from the liquid crystal panel 410R and the light emitting-side polarizer 430R. This is applicable also to the remaining liquid crystal devices 400G and 400B.

As such, the prism structure 550 of the first embodiment enables to space the viewing angle compensation plate 460R from the light emitting-side polarizer 430R and the liquid crystal panel 410R both being a heat-producing member. Therefore, the resulting configuration is not susceptible to heat that much, and becomes ready for projectors of high brightness. Moreover, in the prism structure 550 of the first embodiment, a path is formed between the light emitting-side polarizer 430R and the second light emitting-side polarizer 432R, and between the viewing angle compensation plate 460R and the liquid crystal panel 410R for cooling air Air to flow therethrough. The resulting configuration is protected from heat to a further degree, and becomes ready for projectors of much higher brightness.

In the prism structure 550 of the first embodiment, the light emitting-side optical element is the viewing angle compensation plate 460R as described above. Accordingly, by using the prism structure 550 of the first embodiment to a projector, the resulting projector can have a wider viewing angle.

Second Embodiment

Figure 6:
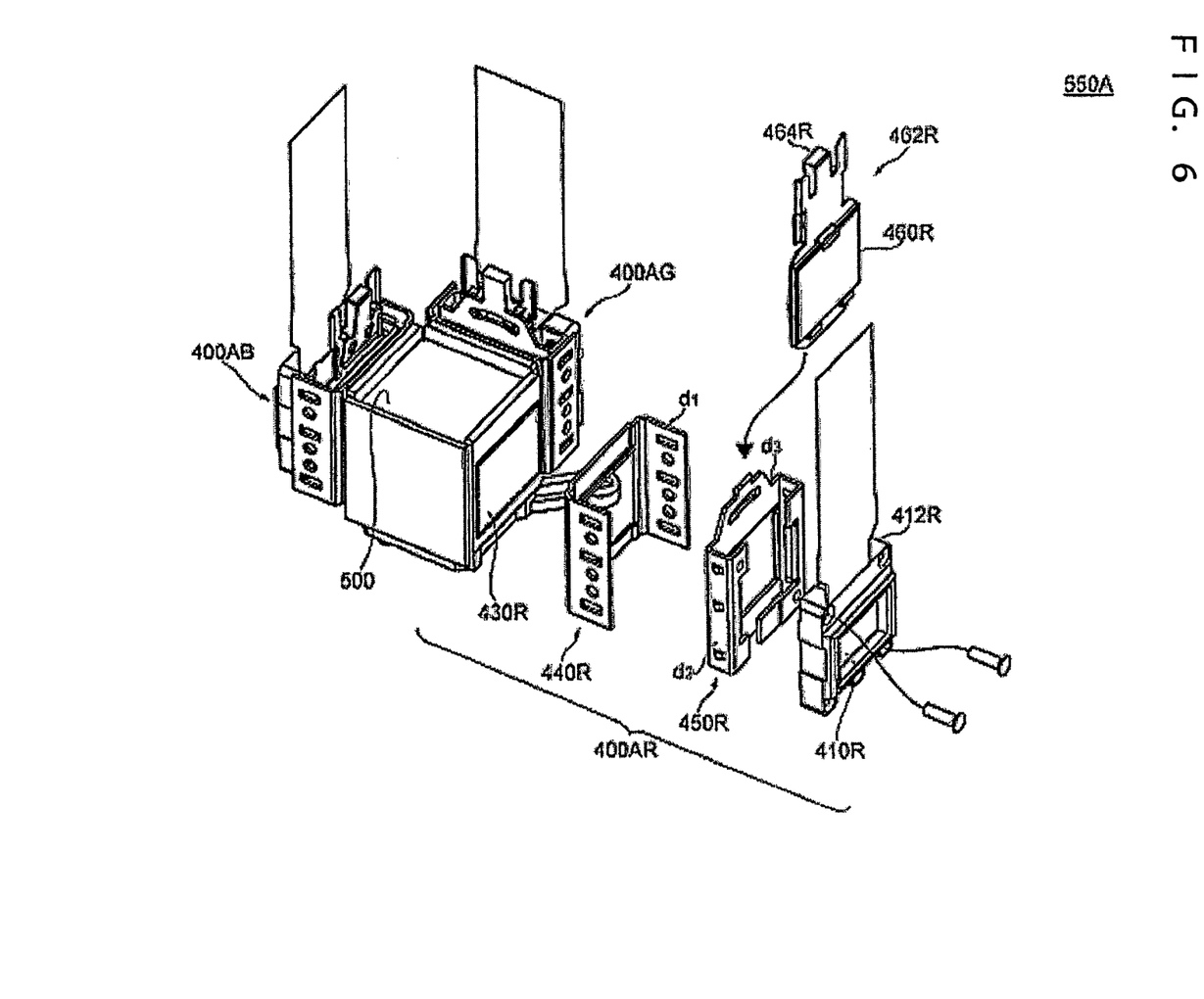
FIG. 6 is a diagram for illustrating a prism structure 550A of a second embodiment.

FIG. 6 is a diagram for illustrating a prism structure 550A of a second embodiment.

Note here that, in FIG. 6, a light emitting-side optical element retention member in a liquid crystal device 400AG is not fully shown at its hold section.

The prism structure 550A of the second embodiment shares basically the same configuration as the prism structure 550 of the first embodiment. As shown in FIG. 6, the difference from the prism structure 550 of the first embodiment lies in that a liquid crystal device 400AR includes no second light emitting-side polarizer. Other liquid crystal devices 400AG and 400AB have the similar configuration as the liquid crystal device 400AR.

As such, the prism structure 550A of the second embodiment is different from the prism structure 550 of the first embodiment in the respect that no second light emitting-side polarizer is provided. However, the light emitting-side optical element retention member 462R is subjected to rotation adjustment about an illumination axis before fixation to the retention member 450R. Accordingly, the viewing angle compensation plate 460R is correctly angled with respect to the liquid crystal panel 410R and the cross dichroic prism 500.

What is more, with the prism structure 550A of the second embodiment, such an angle operation can be implemented with a considerably simple process of subjecting the light emitting-side optical element retention member 462R to rotation adjustment about an illumination axis before fixation to the retention member 450R.

As such, similarly to the prism structure 550 of the first embodiment, the prism structure 550A of the second embodiment has a configuration capable of easing the process of correctly angling the viewing angle compensation plate 460R with respect to the liquid crystal panel 410R and the cross dichroic prism 500.

Other than that, the prism structure 550A of the second embodiment takes the similar configuration to the prism structure 550 of the first embodiment so that the same effects as those of the prism structure 550 of the first embodiment are observed therein.

Third Embodiment

Figure 7A:
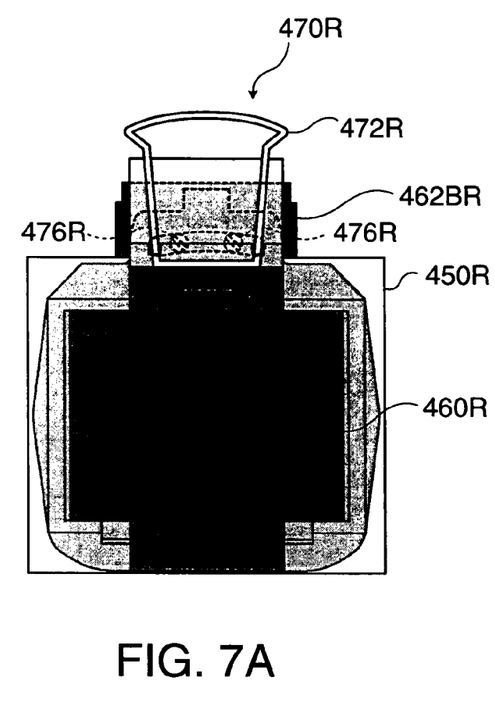
FIGS. 7A to 7C are all a diagram for illustrating both the retention member 450R and the light emitting-side optical element retention member 462R for use in the third embodiment.
Figure 7B:
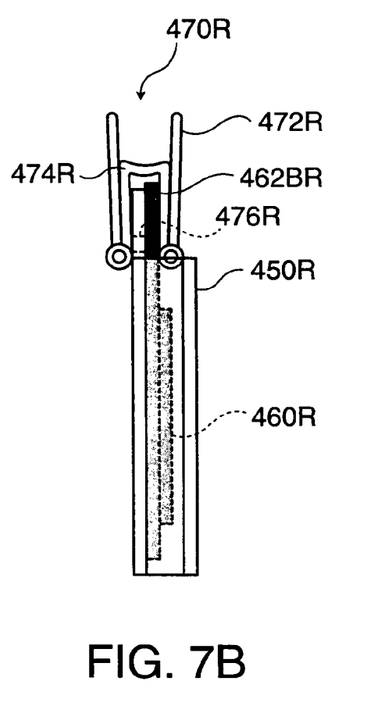
Figure 7C:
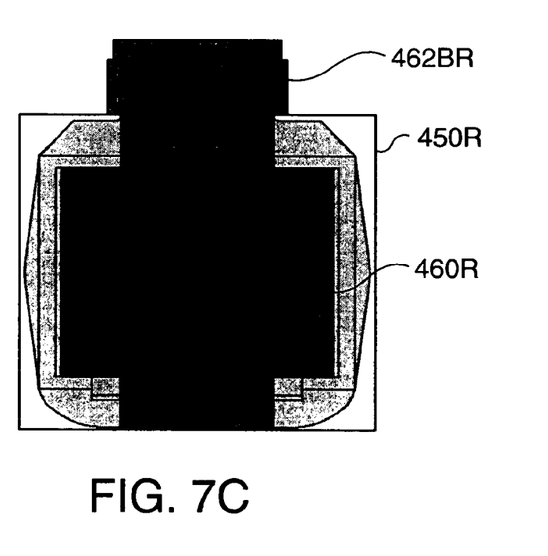

FIGS. 7A to 7C are all a diagram for illustrating the retention member 450R and a light emitting-side polarizer retention member 462BR for use in a third embodiment. Specifically, FIG. 7A is a front view showing the state that the light emitting-side polarizer retention member 462BR is inserted into the retention member 450R. FIG. 7B is a side view showing the state that the light emitting-side optical element retention member 462BR is inserted into the retention member 450R. FIG. 7C is a front view showing the state that a hold jig 470R is removed after the light emitting-side optical element retention member 462BR is inserted into the retention member 450R.

A prism structure 550B of the third embodiment (not shown) shares basically the same configuration as the prism structure 550 of the first embodiment. As shown in FIGS. 7A to 7C, the difference from the prism structure 550 of the first embodiment lies in that the light emitting-side optical element retention member 462BR includes no hold section.

As such, the prism structure 550B of the third embodiment is different from the prism structure 550 of the first embodiment in the respect that the light emitting-side optical element retention member includes no hold section. However, the light emitting-side polarizer retention member 462BR is subjected to rotation adjustment about an illumination axis before fixation to the retention member 450R. Accordingly, the viewing angle compensation plate 460R is correctly angled with respect to the liquid crystal panel 410R (not shown) and the cross dichroic prism 500 (not shown).

What is more, with the prism structure 550B of the third embodiment, such an angle operation can be implemented with a considerably simple process of subjecting the light emitting-side optical element retention member 462BR to rotation adjustment about an illumination axis before fixation to the retention member 450R.

As such, similarly to the prism structure 550 of the first embodiment, the prism structure 550B of the third embodiment has a configuration capable of easing the process of correctly angling the viewing angle compensation plate 460R with respect to the liquid crystal panel 410R and the cross dichroic prism 500.

In the prism structure 550B of the third embodiment, the light emitting-side optical element retention member 462BR is subjected to rotation adjustment while being pushed against the retention member 450R by elasticity of the hold jig 470R that is provided to hold the retention member 450R before attachment and fixation to the retention member 450R.

With such a prism structure 550B of the third embodiment, the process can be eased to a further degree to fix the light emitting-side optical element retention member 462BR to the retention member 450R after rotation adjustment about an illumination axis.

What is better, the light emitting-side optical element retention member 462BR is pushed against the light emitting-side surface $d_3$ of the retention member 450R by elasticity of the hold jig 470R so that the tilt of the viewing angle compensation plate 460R is controlled with respect to the illumination axis, thereby preventing the chromatic aberration due to the tilt from occurring.

After the process of attaching and fixing the light emitting-side polarizer retention member 462BR to the retention member 450R, as shown in FIG. 7C, the hold jig 470R can be removed from the prism structure.

Other than that, the prism structure 550B of the third embodiment takes the similar configuration as the prism structure 550 of the first embodiment so that the same effects as those of the prism structure 550 of the first embodiment are observed therein.

As such, the prism structure and the projector of the invention are described based on the embodiments above. The invention is not surely restrictive to those embodiments, and it is understood that numerous other modifications and variations can be devised without departing from the scope of the invention. For example, the following modifications are possible.

In the prism structures 550, 550A, and 550B of the above embodiments, exemplified is a case of using a viewing angle compensation plate as a light emitting-side optical element. The invention is not surely restrictive thereto, and alternatively, a second light emitting-side polarizer or a light emitting-side polarizer may be an option for the light emitting-side optical element. With this being the case, by using the prism structure of the invention to a projector, the resulting projector can have a high contrast.

The entire disclosure of Japanese Patent Application No. 2005-076857, filed Mar. 17, 2005 is expressly incorporated by reference herein.

What is claimed is:

1. A prism structure, comprising:
a plurality of liquid crystal devices each including a liquid crystal panel and a light emitting-side optical element, and generating an image light through modulation of any of a plurality of color lights in accordance with image information; and
a cross dichroic prism that combines the image lights coming from the liquid crystal devices,
each of the liquid crystal devices further including:
a fixture member that is fixed to the cross dichroic prism;
a retention member that keeps hold of the liquid crystal panel, and is fixed to the fixture member, the retention member having a single guiding arc-shaped hole for rotation adjustment of the light emitting-side optical element;
a light emitting-side optical element retention member that (1) keeps hold of the light emitting-side optical element, (2) is rotation-adjustable about an illumination axis, (3) is provided with only two pins for insertion into the guiding arc-shaped hole, and (4) is rotation-adjusted about the illumination axis before fixation to the retention member; and
a fixing member that fixes the light emitting-side optical element retention member to the retention member.

2. The prism structure according to claim 1, wherein the light emitting-side optical element retention member is subjected to rotation adjustment while being pushed against the retention member before attachment fixation to the retention member.

3. The prism structure according to claim 2, wherein the light emitting-side optical element retention member is provided with a hold section for holding the retention member, and the light emitting-side optical element retention member is subjected to rotation adjustment while being pushed against the retention member by elasticity of the hold section before attachment fixation to the retention member.

4. The prism structure according to claim 1, the light emitting-side optical element is a viewing angle compensation plate.

5. The prism structure according to claim 1, wherein the liquid crystal devices are each further provided with a light emitting-side polarizer that is attached to the cross dichroic prism, and the light emitting-side optical element is a second light emitting-side polarizer.

6. The prism structure according to claim 4, wherein the retention member keeps hold of the light emitting-side optical element with a space both from the liquid crystal panel and the light emitting-side polarizer.

7. The prism structure according to claim 1, wherein the light emitting-side optical element is a light emitting-side polarizer.

8. A projector, comprising:
an illumination device;
a color separation light guiding system that separates an illumination light coming from the illumination device into a plurality of color lights;
a prism structure according to claim 1 that emits an image light as a result of modulation and combination of the color lights coming from the color separation light guiding system in accordance with image information; and
a projection system that projects the image light emitted from the prism structure.

9. The projector according to claim 8, wherein the light emitting-side optical element retention member is subjected to rotation adjustment while being pushed against the retention member before attachment fixation to the retention member.

10. The projector according to claim 9, wherein the light emitting-side optical element retention member is provided with a hold section for holding the retention member, and the light emitting-side optical element retention member is subjected to rotation adjustment while being pushed against the retention member by elasticity of the hold section before attachment fixation to the retention member.

11. The projector according to claim 8, wherein the liquid crystal devices are each further provided with a light emitting-side polarizer that is attached to the cross dichroic prism, and the light emitting-side optical element is a viewing angle compensation plate.

12. The projector according to claim 8, wherein the liquid crystal devices are each further provided with a light emitting-side polarizer that is attached to the cross dichroic prism, and the light emitting-side optical element is a second light emitting-side polarizer.

13. The projector according to claim 11, wherein the retention member keeps hold of the light emitting-side optical element with a space both from the liquid crystal panel and the light emitting-side polarizer.

14. The projector according to claim 8, wherein the light emitting-side optical element is a light emitting-side polarizer.

* * * * *

UNITED STATES PATENT AND TRADEMARK OFFICE
CERTIFICATE OF CORRECTION

PATENT NO.       : 7,661,823 B2  
APPLICATION NO.  : 11/336777  
DATED            : February 16, 2010  
INVENTOR(S)      : Terada et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this

Twenty-eighth Day of December, 2010

David J. Kappos  
*Director of the United States Patent and Trademark Office*